United States Patent
Kaneko

(10) Patent No.: US 8,520,252 B2
(45) Date of Patent: Aug. 27, 2013

(54) PRINTING APPARATUS AND DATA TRANSFER METHOD

(75) Inventor: Kenichi Kaneko, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 252 days.

(21) Appl. No.: 13/171,415

(22) Filed: Jun. 28, 2011

(65) Prior Publication Data
US 2012/0013920 A1 Jan. 19, 2012

(30) Foreign Application Priority Data
Jul. 16, 2010 (JP) .................... 2010-162207

(51) Int. Cl.
*G06K 15/10* (2006.01)
*B41J 29/38* (2006.01)
*B41J 29/393* (2006.01)
*B41J 2/14* (2006.01)

(52) U.S. Cl.
USPC ............... 358/1.8; 347/12; 347/19; 347/47

(58) Field of Classification Search
USPC ............... 358/1.1–1.9, 1.11–1.18; 347/12, 347/19, 47
See application file for complete search history.

(56) References Cited

U.S. PATENT DOCUMENTS
6,086,272 A * 7/2000 Kawase et al. ............... 400/61

FOREIGN PATENT DOCUMENTS
JP   7-089137 A   4/1995
JP   2004-090262 A   3/2004

* cited by examiner

*Primary Examiner* — King Poon
*Assistant Examiner* — Ibrahim Siddo
(74) *Attorney, Agent, or Firm* — Fitzpatrick, Cella, Harper & Scinto

(57) ABSTRACT

In a printing apparatus, in a case where the number of data pieces included in divided block data and indicating driving of printing elements is greater than a predetermined number, the divided block data is converted into first serial data indicating whether or not to drive each printing element belonging to a block corresponding to the divided block data. In a case where the number of data pieces included in the divided block data and indicating driving of printing elements is less than or equal to the predetermined number, the divided block data is converted into second serial data that indicates at least one of the printing elements to be driven among the printing elements belonging to a block corresponding to the divided block data and has a smaller number of bits than the first serial data. Then, the first or the second serial data is transferred to the printhead.

9 Claims, 14 Drawing Sheets

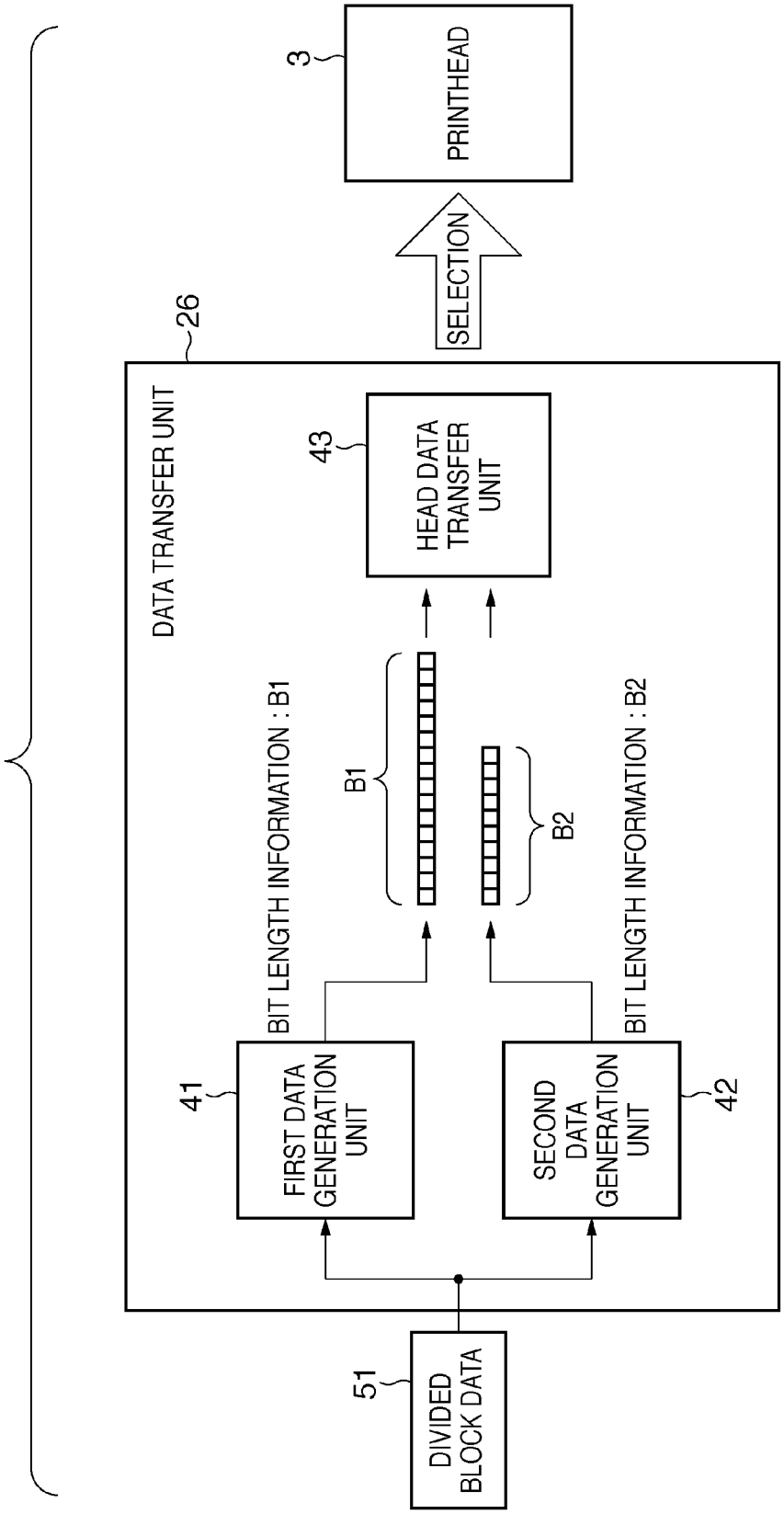

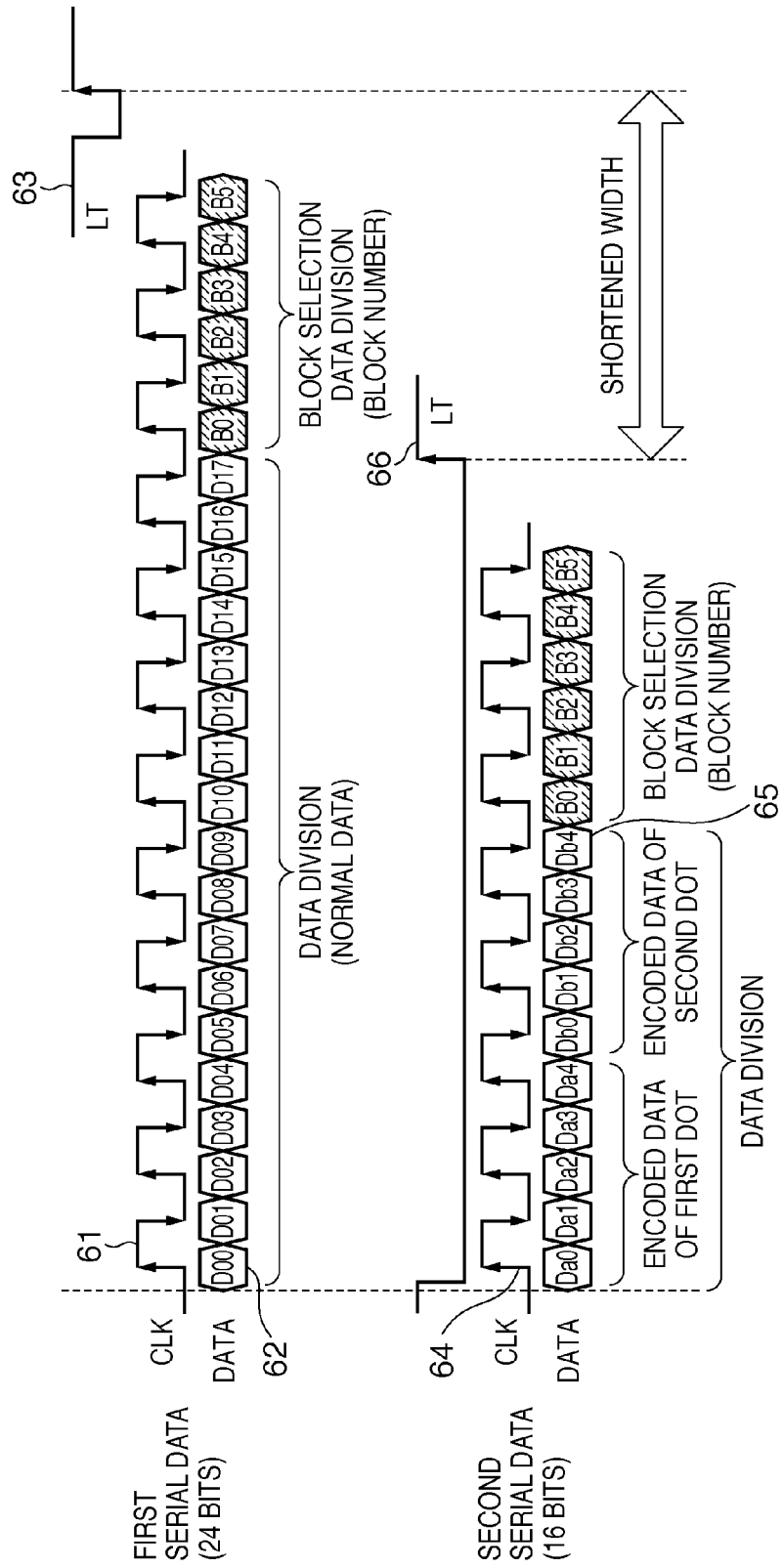

MAXIMUM OF 16 DOTS PRINTED SIMULTANEOUSLY

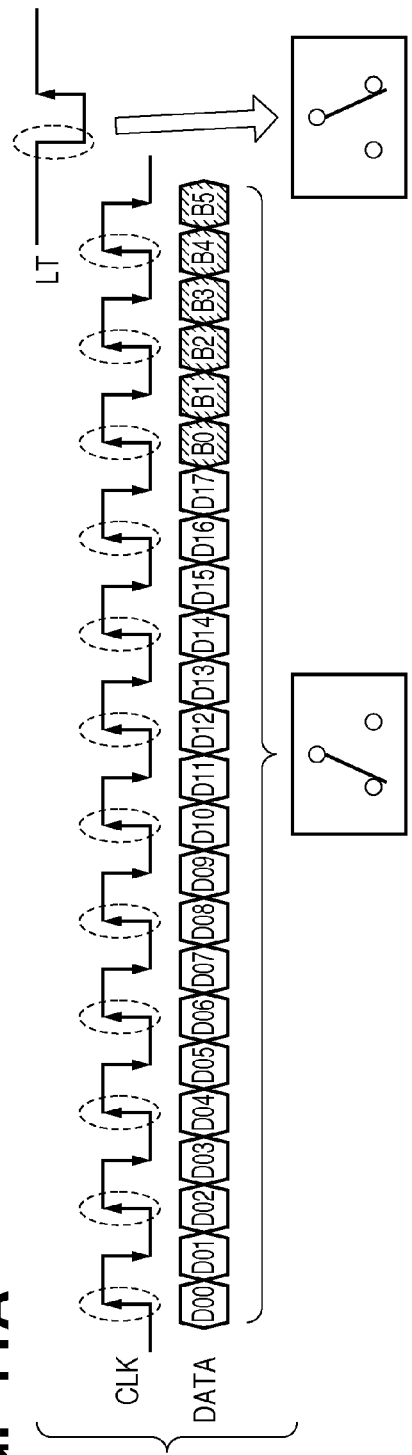
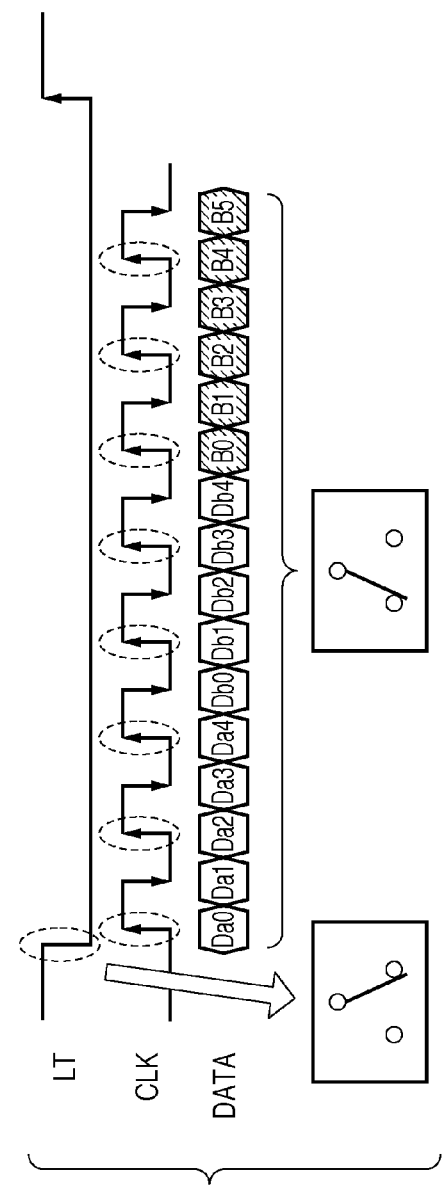
FIG. 11A
FIG. 11B

F I G. 12
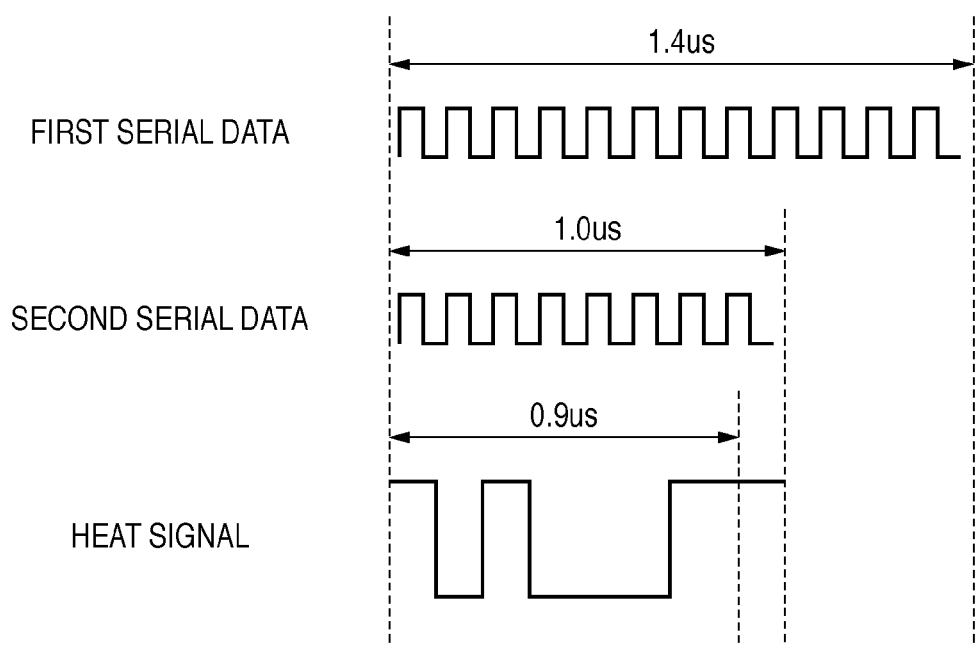

PRINTING APPARATUS AND DATA TRANSFER METHOD

BACKGROUND OF THE INVENTION

1. Field of the Invention

The present invention relates to a printing apparatus and a data transfer method.

2. Description of the Related Art

Printing apparatuses that adopt an inkjet system for performing printing using ink are known. Such printing apparatuses are provided with a printhead and perform printing by the printhead relatively scanning over a printing medium based on raster data. In this case, the printing apparatuses can perform printing based on multiple pieces of raster data with a single scan by the printhead.

Incidentally, high quality printing modes in which high quality printing is achieved by multi-pass printing are known. In multi-pass printing, the same region of a printing medium is printed in multiple steps. In multi-pass printing, the amount of data to be printed with a single scan is limited by randomly masking the print data. For example, in the case where a single piece of print data will be completed by superimposing eight masks, raster print data is completed with eight scans. In this case, one-eighth of the print data is printed with a single scan by the printhead, and print image quality increases as the number of scans performed in multi-pass printing increases. Furthermore, with this increase in the number of scans performed, the amount of data to be printed with a single scan decreases.

In contrast to the aforementioned high quality printing modes, there are high speed printing modes in which all pieces of raster data are printed with a single scan in the case where speed is required in printing. In this case, a high amount (maximum amount) of data is printed by the printhead with a single scan.

The printhead is mounted in a casing called a carriage and performs printing by scanning over a printing medium horizontally. It is thus necessary for a controller circuit, which performs data processing, to serialize data, reduce the number of data pieces, and transfer the data through flexible wires to the printhead.

Here, technology for transferring data to the printhead at high speed without increasing the clock speed of serial data and without increasing the number of signal lines is known. With this technology, signal lines used to access a non-volatile memory in the printhead are exclusively used also for printing operations, and therefore the signal lines for access to the non-volatile memory are switched to and used as signal lines for data transfer (see Japanese Patent Laid-Open No. 2004-090262).

Technology is also known in which in the case where a printhead having different printhead lengths for each color has a circuit configuration formed in accordance with the amount of data transferred for the longest printhead length, images of multiple colors having shorter printhead lengths are superimposed and transferred at a single time (see Japanese Patent Laid-Open No. 07-089137). In this case, the number of signal lines can be reduced.

A method for serializing data before transfer is generally used in order to reduce the number of data pieces, but if the data amount per column increases, it is necessary either to increase the transfer clock speed or to reduce the scanning speed of the carriage to such an extent that data transfer ends on time.

At this time, in the case of a high speed printing mode in which the number of scans performed is small, a single piece of serial data contains a large number of bits at which ink is discharged (a large number of dots printed), whereas in the case of multi-pass printing mode in which multiple scans are performed, the amount of data in a single piece of serial data is reduced and becomes almost "zero" (that is, there is no data). For example, in the case of using a printhead that divides a single column of data into multiple blocks and discharges ink, if 16 bits (print dots) are discharged simultaneously for each block, one-eighth thereof is the amount of data to be printed for each pass in an 8-pass printing mode. That is, data is contained at most in two dots out of 16 dots.

Furthermore, in the case of high quality printing modes in which multiple scans are performed, it is necessary to shorten discharge intervals in the scanning direction (column direction) (that is, to increase the discharge frequency) and to perform printing at higher resolution. Therefore, if the data transfer will not end on time, the scanning speed of the carriage needs to be reduced. This produces conflicts between the need to shorten data transfer intervals and the fact that data transferred itself contains almost no data.

SUMMARY OF THE INVENTION

The present invention provides technology for encoding serial data and transferring the encoded data to a printhead in a case where the number of print dots in a single block of data is less than or equal to a predetermined number.

According to a first aspect of the present invention there is provided a printing apparatus including a printhead in which printing elements provided in correspondence with a plurality of nozzles are divided into a plurality of blocks and the printing elements are driven block-by block, the apparatus printing an image on a printing medium by driving the printhead based on divided block data for driving printing elements that belong to a same block, the apparatus comprising: a first converter configured to, in a case where the number of data pieces included in the divided block data and indicating driving of the printing elements is greater than a predetermined number, convert the divided block data into first serial data that indicates whether or not each printing element belonging to the block corresponding to the divided block data is to be driven; a second converter configured to, in a case where the number of data pieces included in the divided block data and indicating driving of the printing elements is less than or equal to the predetermined number, convert the divided block data into second serial data that indicates at least one of the printing elements to be driven among the printing elements belonging to the block corresponding to the divided block data, the second serial data having a smaller number of bits than the first serial data; and a transfer unit configured to transfer either the first serial data or the second serial data to the printhead, wherein in a case where the second serial data has been received, the printhead converts the second serial data into a data format of the first serial data.

According to a second aspect of the present invention there is provided a data transfer method performed by a printing apparatus including a printhead in which printing elements provided in correspondence with a plurality of nozzles are divided into a plurality of blocks and the printing elements are driven block-by-block, the apparatus printing an image on a printing medium by driving the printhead based on divided block data for driving printing elements that belong to a same block, the method comprising the steps of: converting, in a case where the number of data pieces included in the divided block data and indicating driving of the printing elements is greater than a predetermined number, the divided block data into first serial data indicating whether or not each printing element belonging to the block corresponding to the divided block data is to be driven; converting, in a case where the number of data pieces included in the divided block data and indicating driving of the printing elements is less than or equal to the predetermined number, the divided block data into second serial data that indicates at least one of the printing elements to be driven among the printing elements belonging to the block corresponding to the divided block data, the second serial data having a smaller number of bits than the first serial data; and transferring either the first serial data or the second serial data to the printhead, wherein in a case where the second serial data has been received, the printhead converts the second serial data into a data format of the first serial data.

Further features of the present invention will be apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 4 is a diagram showing an example of a configuration of a data transfer unit 26 shown in FIG. 3A.

FIG. 5 is a diagram showing an example of structures of first serial data and second serial data.

FIGS. 11A and 11B are diagrams showing an example of switching control.

FIG. 12 is a diagram showing an example of a temporal relationship between serial data pieces and a heat signal in terms of time.

DESCRIPTION OF THE EMBODIMENTS

An exemplary embodiment of the present invention will now be described in detail with reference to the drawings. It should be noted that the relative arrangement of the components, the numerical expressions and numerical values set forth in these embodiments do not limit the scope of the present invention unless it is specifically stated otherwise.

Note that the following description will exemplify a printing apparatus which adopts an ink-jet printing system. However, the present invention is not limited to such a specific system. For example, an electrophotographic system using toners as color materials may be adopted.

The printing apparatus may be, for example, a single-function printer having only a printing function, or a multi-function printer having a plurality of functions including a printing function, a FAX function, and a scanner function. Also, the printing apparatus may be, for example, a manufacturing apparatus used to manufacture a color filter, an electronic device, an optical device, a micro-structure, and the like using a predetermined printing system.

In this specification, "printing" means not only forming significant information such as characters or graphics but also forming, for example, an image, design, pattern, or structure on a printing medium in a broad sense regardless of whether the formed information is significant, or processing the medium as well. In addition, the formed information need not always be visualized so as to be visually recognized by humans.

Also, a "printing medium" means not only a paper sheet for use in a general printing apparatus but also a member which can fix ink, such as cloth, plastic film, metallic plate, glass, ceramics, resin, lumber, or leather in a broad sense.

Also, "ink" should be interpreted in a broad sense as in the definition of "printing" mentioned above, and means a liquid which can be used to form, for example, an image, design, or pattern, process a printing medium, or perform ink processing upon being supplied onto the printing medium. The ink processing includes, for example, solidification or insolubilization of a coloring material in ink supplied onto a printing medium.

Figure 1:
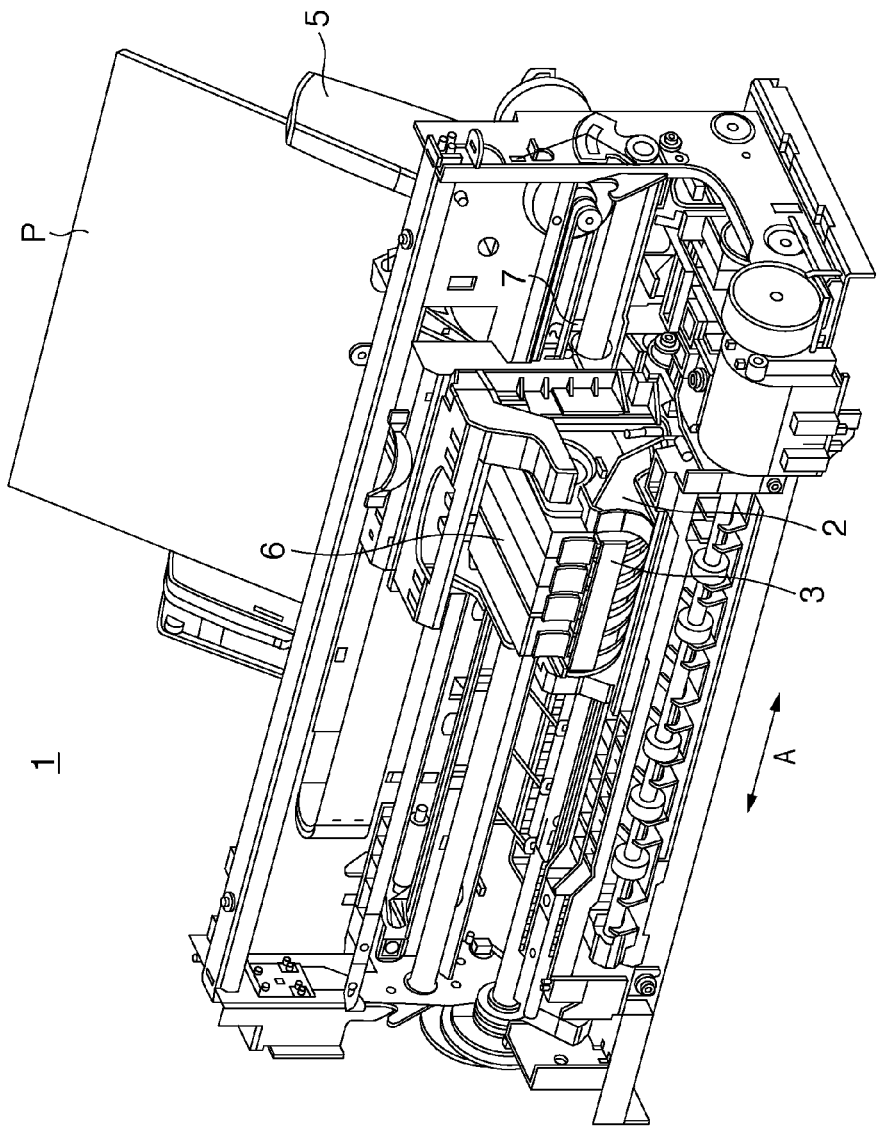
FIG. 1 is a perspective view showing an example of an external configuration of an ink-jet printing apparatus 1 according to an embodiment of the present invention.

FIG. 1 is a perspective view showing an example of an external configuration of an ink-jet printing apparatus 1 according to an embodiment of the present invention.

The ink-jet printing apparatus (hereinafter referred to as the "printing apparatus") 1 has mounted, in a carriage 2, an ink-jet printhead (hereinafter referred to as the "printhead") 3 that performs printing by discharging ink in accordance with an inkjet system. The printing apparatus 1 performs printing by moving the carriage 2 back and forth in a predetermined direction (indicated by arrow A). The printing apparatus 1 feeds a printing medium P, such as printing paper, via a sheet supply mechanism 5 and conveys the printing medium P to a printing position. At the printing position, the printing apparatus 1 performs printing by discharging ink from the printhead 3 to the printing medium P.

In addition to the printhead 3, an ink cartridge 6, for example, is mounted in the carriage 2 of the printing apparatus 1. The ink cartridge 6 stores ink to be supplied to the printhead 3. Note that the ink cartridge 6 is detachable from the carriage 2.

The printing apparatus 1 shown in FIG. 1 is capable of performing color printing. Accordingly, the carriage 2 has mounted therein four ink cartridges for housing magenta (M), cyan (C), yellow (Y), and black (K) ink, respectively. These four ink cartridges are detachable independently of one another.

The printhead 3 according to the present embodiment adopts an inkjet system for discharging ink using thermal energy. The printhead 3 is thus provided with electrothermal transducers (heaters). The electrothermal transducers are provided corresponding to each orifice, and a pulse voltage is applied to corresponding electrothermal transducers in accordance with a printing signal. In response to this, ink is discharged from the corresponding orifices.

Here, the printing apparatus 1 has multiple multi-pass printing modes in which printing of the same printing region of a printing medium is completed by the printhead 3 scanning over the printing region multiple times. In the multi-pass printing modes, print data is thinned out by using a mask for each pass. In an 8-pass printing mode in which printing of the same printing region is completed with eight scans by the printhead 3, an image to be formed for each pass on a printing medium is based on one-eighth of print data obtained by thinning out the entire print data.

Figure 2:
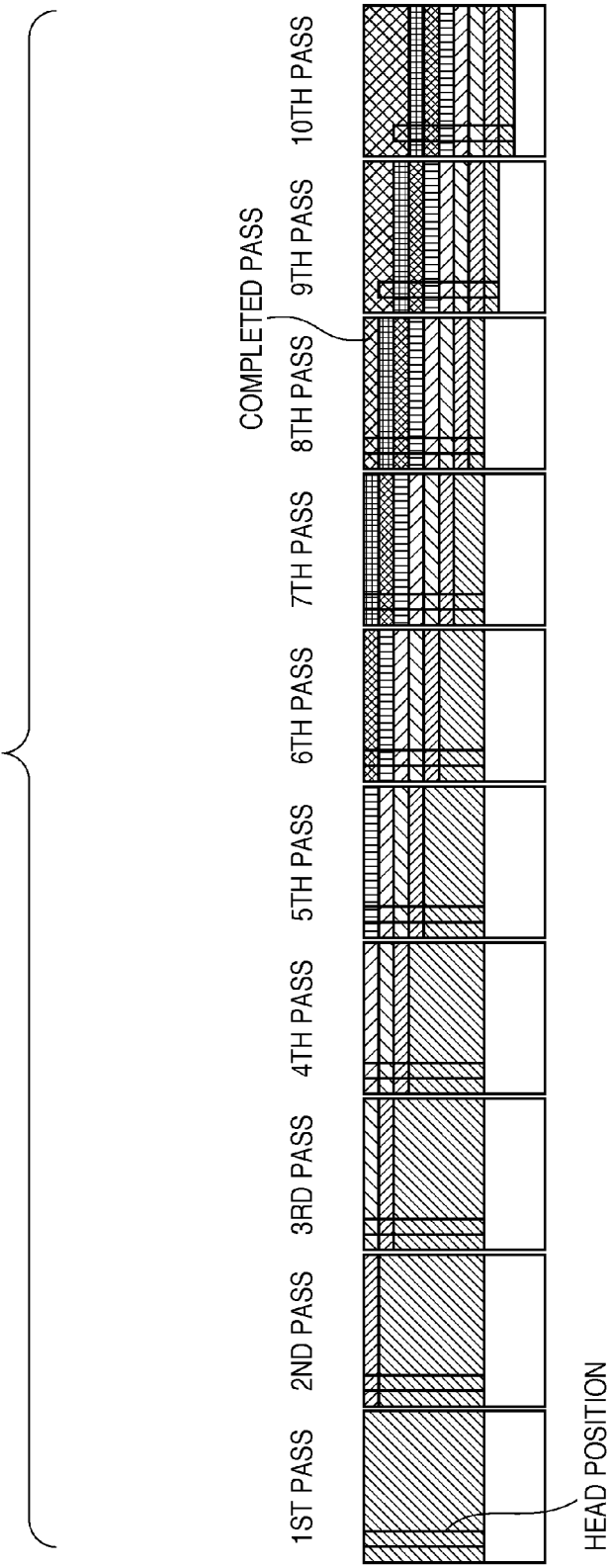
FIG. 2 is a diagram illustrating an outline of multi-pass printing.

The following is a brief description of multi-pass printing taking the example of the 8-pass printing mode, with reference to FIG. 2. For each of the first to eighth passes, printing is performed using one-eighth of print data obtained by thinning out the entire print data. Because a different nozzle range of the printhead is used for each pass, variations in the amount of discharge from each nozzle can be reduced.

During each interval between passes, the printing medium is conveyed by the length corresponding to one-eighth of a nozzle array. By sequentially printing each one-eighth of print data obtained by thinning out the entire print data in this way, printing of an image of each printing region is completed. Note that printing is also performed by a similar method in other multi-pass printing modes each having a different number of passes.

Figure 3A:
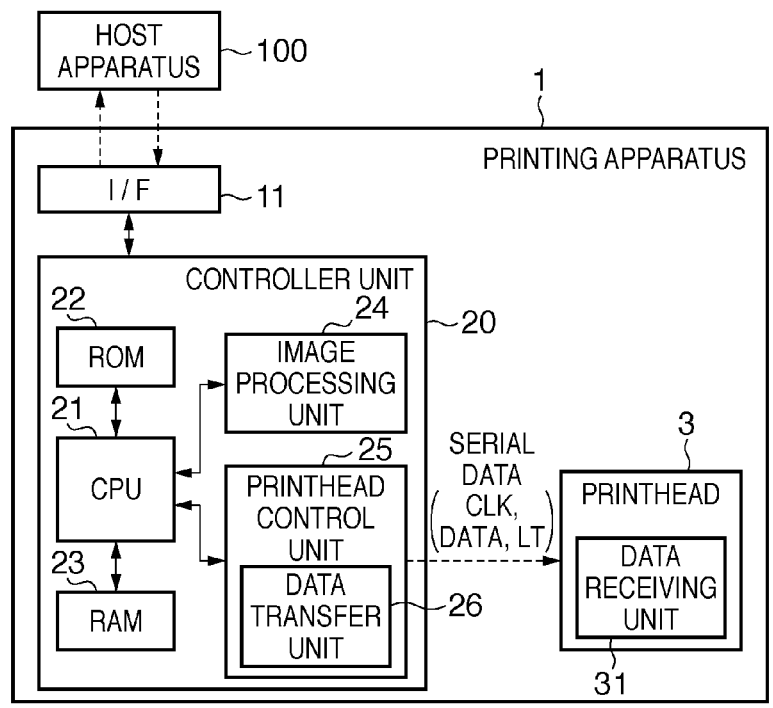
FIGS. 3A and 3B are diagrams showing an example of a functional configuration of the printing apparatus 1 shown in FIG. 1.

FIG. 3A is a diagram showing an example of a functional configuration of the printing apparatus 1 shown in FIG. 1.

The printing apparatus 1 is connected to a host apparatus 100. The host apparatus 100 is implemented by a computer (or a reader for image reading or a digital camera), which is a supply source of image data. The host apparatus 100 and the printing apparatus 1 transmit and receive, for example, image data and commands therebetween via an interface (hereinafter referred to as the "I/F") 11.

A controller unit 20 is constituted by a central processing unit (CPU) 21, a read only memory (ROM) 22, a random access memory (RAM) 23, an image processing unit 24, and a printhead control unit 25.

The CPU 21 performs centralized control of processing performed by the controller unit 20. The ROM 22 stores programs and various types of data. The RAM 23 is used as a work area in the case where the CPU 21 executes a program, and temporarily stores various types of calculation results or the like.

The image processing unit 24 performs various types of image processing on image data received from the host apparatus 100 via the I/F 11. For example, in multi-pass printing modes, the image processing unit 24 generates print data by thinning out data using masks in accordance with the number of passes in the multi-pass printing modes.

The printhead control unit 25 serves to control the printhead 3 and is provided with a data transfer unit 26. The data transfer unit 26 generates data (serial data) to be transferred to the printhead 3, and transfers the generated serial data to the printhead 3. The serial data includes a clock signal (CLK), a data signal (DATA), and a latch signal (LT). The printhead control unit 25 drives each nozzle in the printhead 3 based on the data transferred from the data transfer unit 26. Accordingly, ink is discharged from each nozzle, and thereby printing is performed.

Figure 3B:
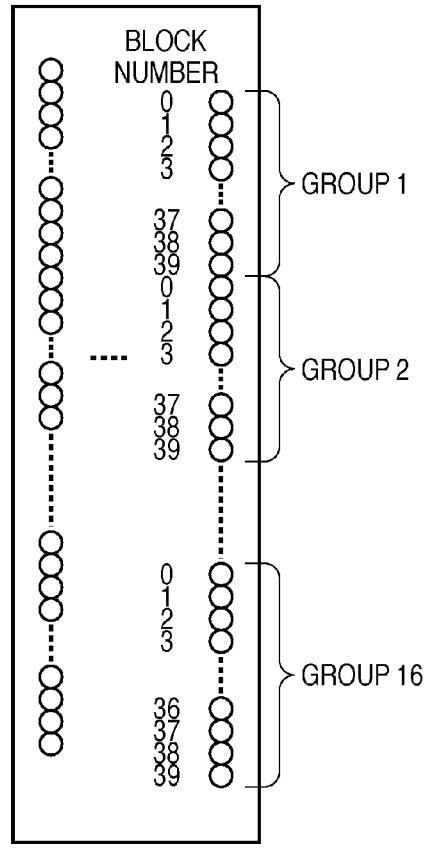

The printhead 3, which will be discussed in detail later, is provided with a data receiving unit 31. The data receiving unit 31 receives the serial data sent from the controller unit 20. Here, as shown in FIG. 3B, the printhead 3 has multiple nozzle arrays arranged therein. Each nozzle is provided with a heater.

Each nozzle array is divided into M groups (in the present embodiment, 16 groups; in actuality, 18 groups including two dummy-nozzle groups), each group including N adjacent nozzles (in the present embodiment, 40 nozzles). Each nozzle array is also divided into N blocks, each composed of one nozzle from each group. The heaters in each group, which are provided for each of the nozzles, are driven in a time-divisional manner, specifically, M heaters at a time and a total of N times. Note that time-divisional driving is common technology and therefore a detailed description thereof has been omitted, but it may be performed based on, for example, the clock signal (CLK), the data signal (DATA), and the latch signal (LT).

Now, an example of a configuration of the data transfer unit 26 shown in FIG. 3A will be described with reference to FIG. 4.

The data transfer unit 26 has a functional configuration including a first data generation unit 41, a second data generation unit 42, and a head data transfer unit 43.

The first data generation unit 41 performs parallel-serial conversion on divided block data (print data divided on a block-by-block basis) 51. Thereby, general serial data (first serial data) B1 is generated.

The second data generation unit 42 performs parallel-serial conversion on the divided block data 51 and then performs encoding processing. Thereby, encoded serial data (second serial data) B2 is generated. Note that the second serial data has a shorter data length than the first serial data.

Here, the present embodiment adopts a configuration in which printing is possible in five printing modes, each having a different number of passes, namely, a 1-pass printing mode, a 2-pass printing mode, a 4-pass printing mode, an 8-pass printing mode, and a 16-pass printing mode. In the configuration, such printing modes (the number of passes) are determined in accordance with the type of a printing medium used for printing and print quality selected by a user.

Depending on whether or not the selected printing mode is an 8-pass or higher printing mode (i.e., the 8-pass printing mode or the 16-pass printing mode), the CPU 21 performs control either to use the first data generation unit 41 or to use the second data generation unit 42 in order to convert the divided block data 51 into serial data. More specifically, in the case where a second printing mode including 8 or more passes (either an 8-pass or 16-pass printing mode) has been selected, the second data generation unit 42 is selected. On the other hand, in the case where a first printing mode including less than 8 passes (the 1-pass, 2-pass, or 4-pass printing mode) has been selected, the first data generation unit 41 is selected. In the present embodiment, since time-divisional driving is performed with 16 nozzles allocated to each block, the configuration is such that in the 8-pass printing mode, at most two nozzles are driven by the divided block data for each pass. In the 16-pass printing mode, at most one nozzle is driven by the divided block data for each pass. In the present embodiment, the second data generation unit 42 is selected in the printing modes (the 8- and 16-pass printing modes) in which the number of nozzles driven by the divided block data for each pass (the number of dots discharged) is less than or equal to a predetermined number (in the present example, two). The details of data generation performed by the first and second data generation units 41 and 42 will be discussed later.

The head data transfer unit 43 transfers either the first serial data B1 or the second serial data B2 to the printhead 3.

Here, in the case where the first serial data has been received, the printhead 3 performs serial-parallel conversion on the received data and then sets the converted data in a latch register 78 (discussed later). On the other hand, in the case where the second serial data has been received, the printhead 3 decodes the received data (converts the received data into the data format of the first serial data), performs serial-parallel conversion on the decoded data, and sets the converted data in the latch register 78 (discussed later).

Next is a description of an example of the structure of the serial data (the first serial data and the second serial data) transferred from the controller unit 20 to the printhead 3, with reference to FIG. 5.

The first serial data is composed of a data division (18 bits) for holding group numbers and a block selection data division (6 bits) for holding block numbers. Each data piece therein is set in synchronization with the rising and falling of a clock signal 61.

In the case of receiving the first serial data, upon detecting input of the clock signal 61 12 times and then detecting an input of a latch signal 63 that indicates completion of data transfer, the data receiving unit 31 of the printhead 3 regards the data pieces received during that time as a single cluster of serial data. Upon receiving the input of the latch signal 63 as a trigger after data reception, the data receiving unit 31 of the printhead 3 determines that the first serial data has been received, and performs corresponding processing.

The second serial data is composed of a data division holding two pieces of data (each with 5 bits) and a block selection data division (6 bits). The two data pieces (encoded data) held in the data division have been encoded. The second serial data has a data length of 16 bits, which indicates that the data transfer time is shortened by the amount of 8 bits as compared with the case of the first serial data (24 bits).

In the case where the second serial data is received, a latch signal 66 is fixed at a low level, and the signal 66 transitions to a high level after reception of the data division and the block selection data division.

In the case of receiving the latch signal 66 having such a long pulse width, the data receiving unit 31 of the printhead 3 determines that the second serial data has been received, and performs decoding processing. Note that because the group numbers (m and n) of nozzles become known by this decoding, subsequent processing is performed in the same manner as in the case of receiving the first serial data.

Now, an example of the structure of the second serial data (encoded data) will be described with reference to FIGS. 6A and 6B. Note that in the present embodiment, print data (18 bits) generated at each time of printing is composed of 18 dots, and the second serial data is generated in printing modes in which the number of dots printed is less than or equal to a predetermined number (in the present example, two).

In the case of generating the second serial data, each dot in print data is checked, and if there is a bit number indicating the presence of a print dot, the corresponding data is represented by five bits. Such 5-bit data can represent numbers from 0 to 31.

Here, number 0 and number 17 are generally special numbers used for dummy nozzles and are not used. Accordingly, nozzles used for actual printing are designated by numbers from 1 to 16. Note that two encoded data pieces are set in the second serial data. For this reason, in the case where print data contains only one bit number indicating the presence of a print dot, "11111 (31st)" that indicates the absence of applicable data is set for one encoded data piece. It should be noted that the data indicating the absence of applicable data is not limited to "11111 (31st)" and may be set arbitrarily as long as it is meaningless data (in the case of the present embodiment, numbers other than 0 to 17).

Figure 6A:
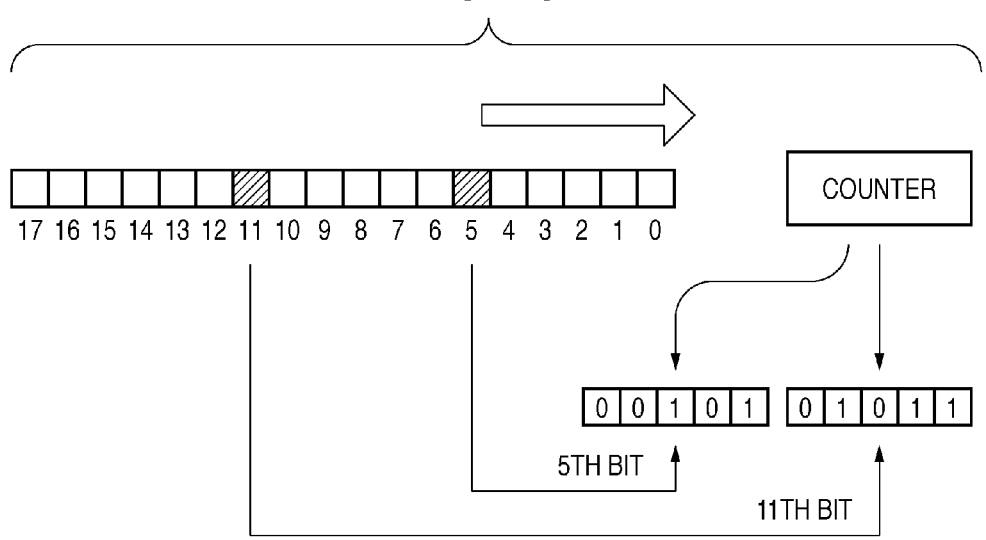
FIGS. 6A and 6B are diagrams showing examples of the structure of the second serial data.

Here, in the case where print data shown in FIG. 6A has been received, print dots exist in the 5th and 11th bits, and therefore encoded data pieces "00101 (5th)" and "01011 (11th)", which represent the print dots by five bits, are set in the data division.

Figure 6B:
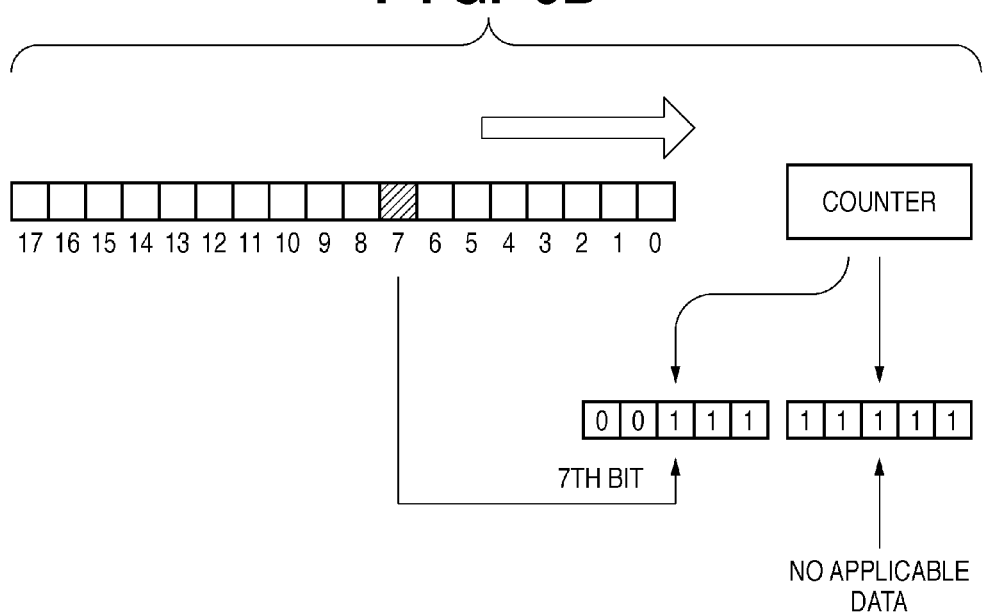

In the case of FIG. 6B, a print dot exists in only the 7th bit, and therefore encoded data pieces "00111 (7th)" and "11111 (31st)", the latter indicating the absence of applicable data, are set in the data division. As described above, the data division is provided as a bit region that indicates a predetermined number of nozzles (in the present embodiment, two) from which ink is discharged, and dummy information is set if there is no applicable data as described above. Accordingly, zero to two print dots can be represented in the second serial data.

Figure 7:
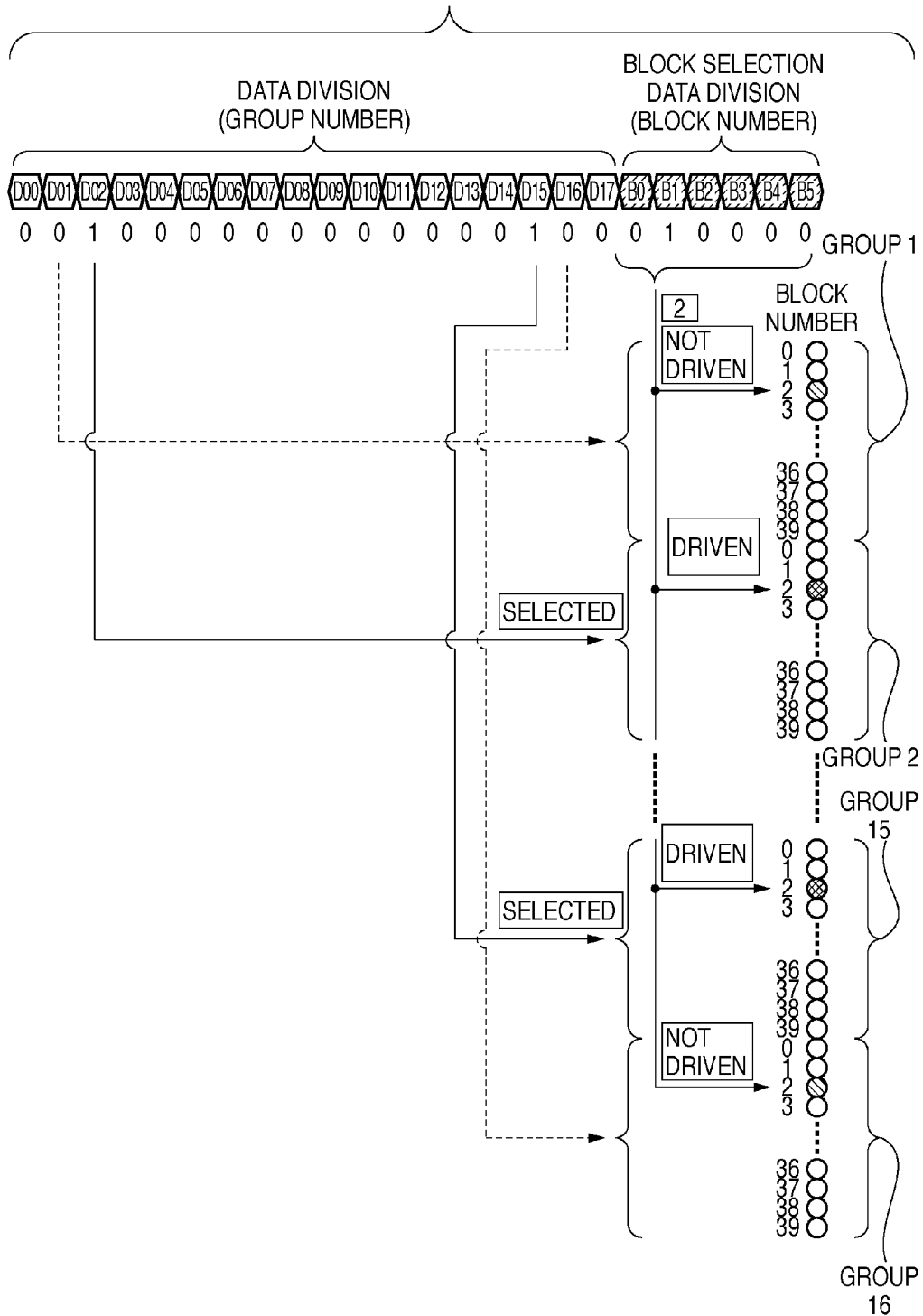
FIG. 7 is a diagram showing an example of a correspondence between the first serial data and nozzles.
Figure 8:
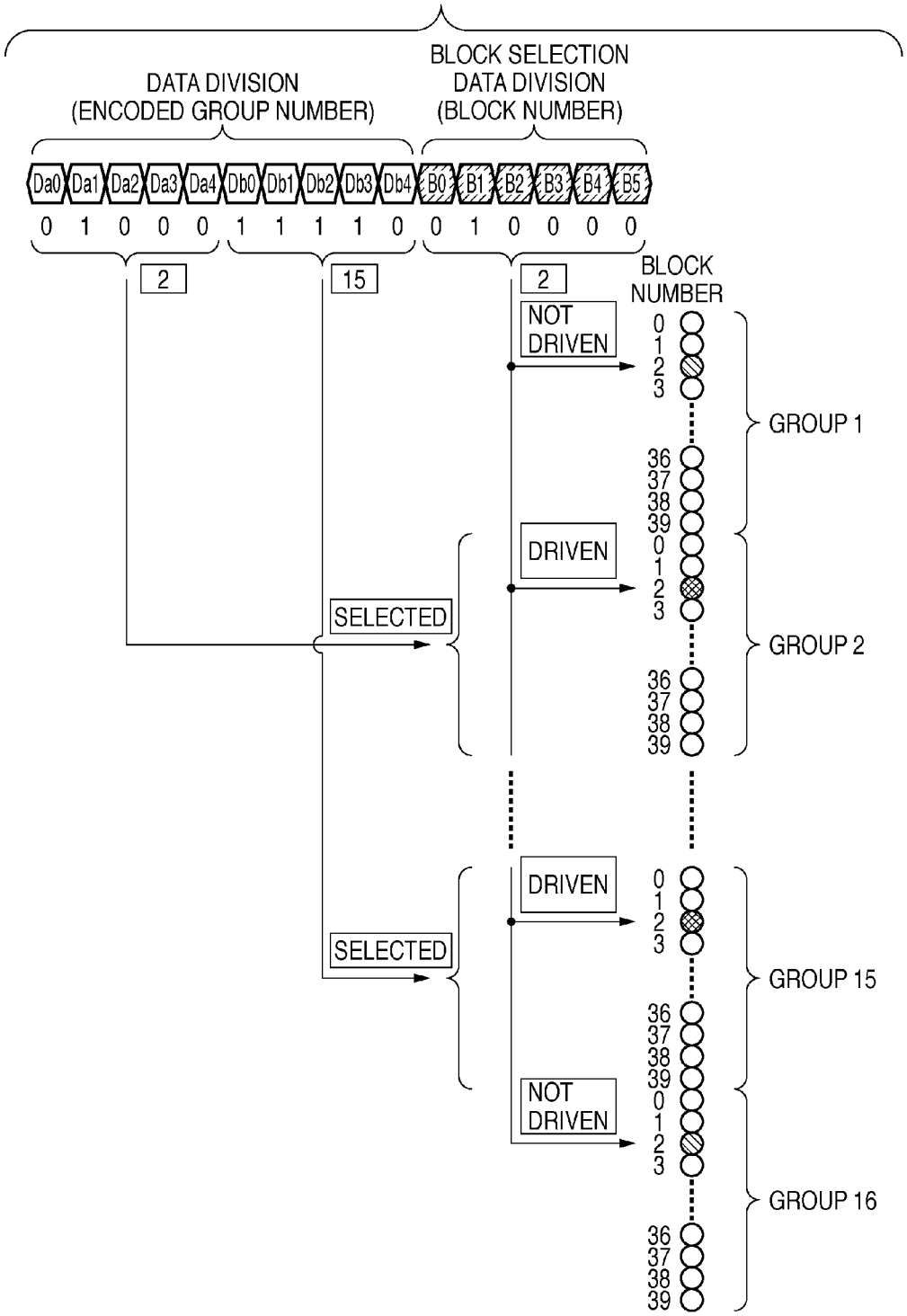
FIG. 8 is a diagram showing an example of a correspondence between the second serial data and nozzles.

Next is a description of a correspondence between the serial data (the first serial data and the second serial data) and nozzles with reference to FIGS. 7 and 8. Note that the data division indicates group numbers from 1 to 16, and the following 6-bit block selection data division indicates block numbers from 0 to 39. Accordingly, the data positions of 640 nozzles (16 groups×40 blocks) can be indicated. Here, both FIGS. 7 and 8 show the case where printing is performed using nozzles that belong to groups 2 and 15, respectively, and both have block number 2. Note that group 0 and group 17 indicate dummy nozzles on both sides and therefore a description thereof has been omitted.

First, a correspondence between the first serial data and nozzles is described with reference to FIG. 7.

In the first serial data, the 1st to 16th bits of the data division, excluding the 0th and 17th bits, indicate group numbers 1 to 16. The following 6-bit block selection data division indicates block numbers 0 to 39.

In the case of FIG. 7, "001000000000000100" (from MSB to LSB) is set in the data division, and "000010" (from MSB to LSB) is set in the block selection data division. This indicates two dots among the 640 nozzles (that is, nozzles that belong to group 2 and group 15, respectively, and both have block number 2).

FIG. 8 shows a correspondence between the second serial data and nozzles. The second serial data shown in FIG. 8 and the first serial data shown in FIG. 7 have the same data held in the block selection data division, but differ in data held in their data divisions. Specifically, in order to indicate group 2 (="00010") and group 15 (="01111"), data "0111100010" (from MSB to LSB) obtained by combining these two data pieces is set in the second serial data.

As described above, if the second serial data as shown in FIG. 8 is used in the case where data pieces for simultaneous discharge is two dots or less, the data transfer time can be shortened by the amount of 8 bits.

Figure 9:
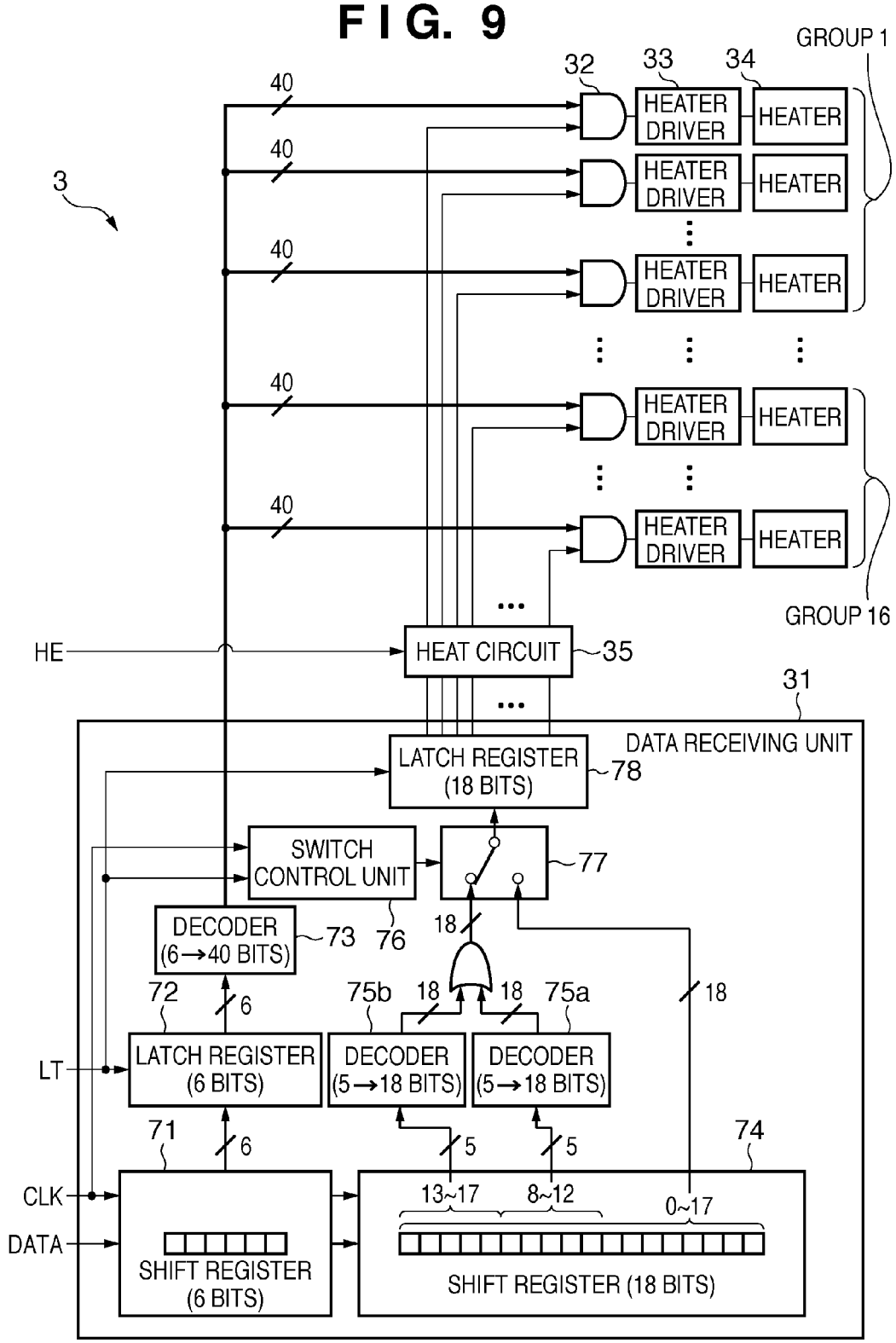
FIG. 9 is a diagram showing an example of a configuration of a printhead 3 shown in FIGS. 3A and 3B.

Next is a description of an example of a configuration of the printhead 3 shown in FIGS. 3A and 3B, with reference to FIG. 9.

As described above, the printhead 3 is provided with M×N heaters 34. The heaters 34 are divided into M groups (in the present embodiment, 16 groups; in actuality, 18 groups), each group including N adjacent heaters (in the present embodiment, 40 heaters). The heaters 34 are also divided into N blocks, each composed of one heater 34 from each group. The heaters 34 in each group are driven in a time-divisional manner, specifically, M heaters at a time and a total of N times.

Each heater 34 is provided with a heater driver 33 that is configured to apply voltage to the heater 34 and drive the heater 34. A heater selection circuit 32 is provided for each pair of a heater driver 33 and a heater 34 and is configured to output a signal (output voltage) in the case where the corresponding pair of the heater driver 33 and the heater 34 is targeted for driving. Accordingly, a heater 34 targeted for driving can be selected.

When driving heaters 34, first, print data signals received from the latch register 78 for holding 18-bit data and heat signals (HE) are input to a heat circuit 35. The heat circuit 35 takes the logical AND of these signals. Then, the print data signals that have undergone the AND operation and were received from the heat circuit 35, and block selection signals from a decoder 73 are input to the heater selection circuits 32. Note that the heat signals serve to define heat times and indicate driving timings of the heaters for each column.

The heater selection circuits 32 take the logical AND of these signals and output signals based on the results to their heater drivers 33. Upon receiving these signals, the heater drivers 33 apply voltage to the corresponding heaters 34. The above-described operation is repeated N times. Accordingly, time-divisional driving is realized.

Figure 10:
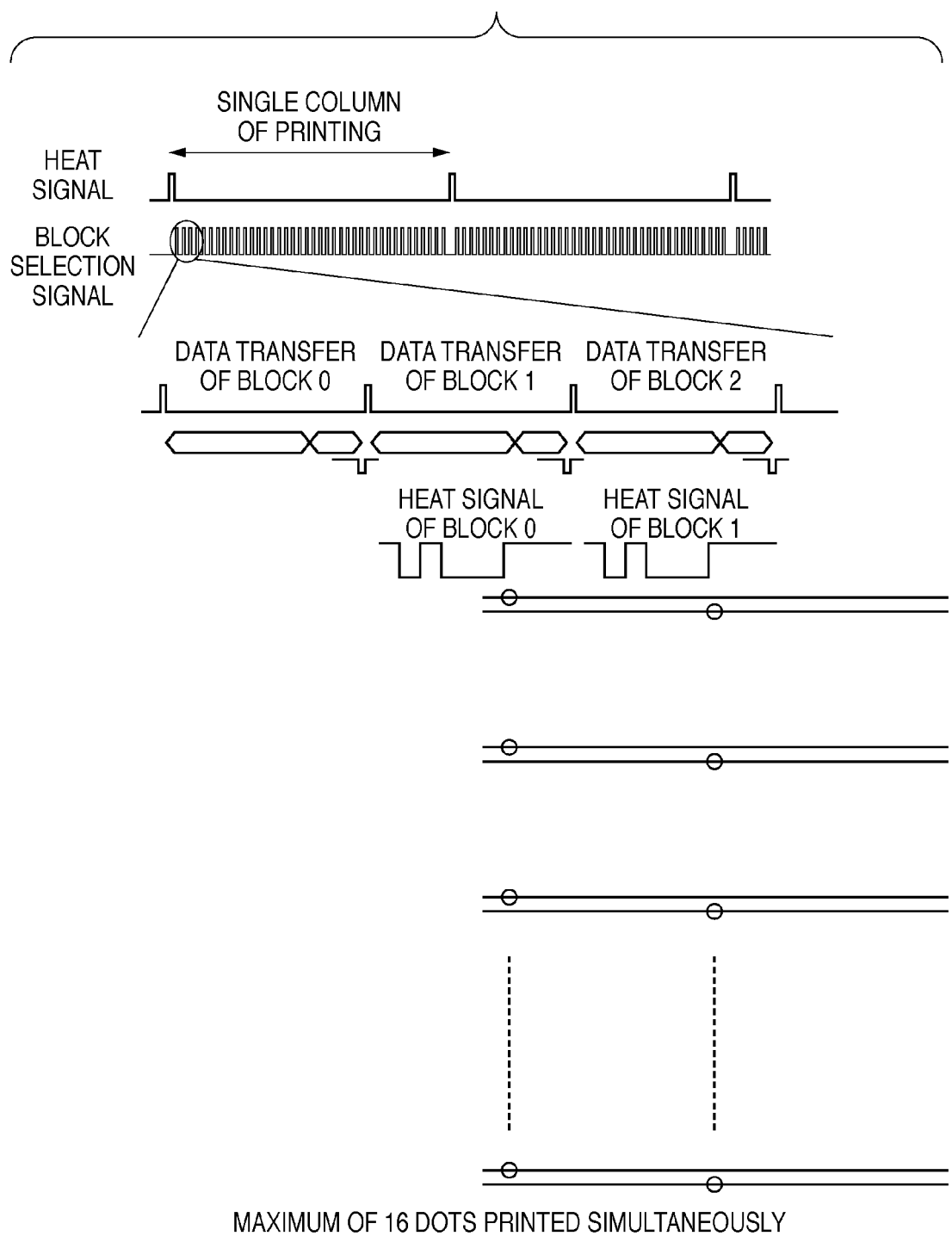
FIG. 10 is a diagram showing an example of driving timings of blocks when printing a single column.

When printing a single column of print data, block selection signals are generated at the times shown in FIG. 10. There are 40 block selection signals between heat signals. The block selection signals indicate transfer times of the serial data and ink discharge times. With the first block selection signal, data of block 0 is input to the heater drivers 33, and at the time when the next block selection signal is input, data of block 1 is input to the heater drivers 33 and ink is discharged from the nozzles that belong to block 0. In a single ink discharge operation, ink is discharged from the nozzles of groups 1 to 16 that belong to one of the 40 blocks, and therefore ink can be discharged simultaneously from at most 16 discharging nozzles in each nozzle array.

Now, the procedure of processing performed by the data receiving unit 31 will be described with reference to FIG. 9.

Upon receiving the serial data (the first serial data or the second serial data), the data receiving unit 31 inputs the data held in the block selection data division from the shift register 71 to a latch register 72 at the timing of the latch signal (LT). Accordingly, serial-parallel conversion is performed on the data held in the block selection data division. The 6-bit parallel converted data of the block selection data division is decoded by the decoder 73 into 40-bit data.

Here, in the case of receiving the first serial data, the data receiving unit 31 inputs the data held in the data division (data indicating group numbers) from a shift register 74 to the latch register 78 via a switching circuit 77 at the timing of the latch signal. Accordingly, serial-parallel conversion is performed on the data held in the data division. That is, in the case where the first serial data has been received, the data held in the shift register 74 is directly input to the latch register 78.

In the case of receiving the second serial data, the data receiving unit 31 inputs the data held in the data division (data indicating group numbers) from the shift register 74 to decoders 75a and 75b at the timing of the latch signal. The decoder 75a receives input of data of the 8th to 12th bits among the data held in the data division, and the decoder 75b receives input of data of the 13th to 17th bits among the data held in the data division. The decoders 75a and 75b each decode 5-bit data into 18-bit data.

The switching circuit 77 is provided between the latch register 78 and the decoders 75a and 75b. The switching circuit 77 switches between the shift register 74 and the decoders 75a and 75b in order to input data to the latch register 78.

The following is a description of switching control of the switching circuit 77 performed by the switch control unit 76.

The switch control unit 76 switches the switching circuit 77 at the time of the falling of the latch signal and at the time of the rising of the clock signal. Specifically, upon detecting the falling of the latch signal, the switch control unit 76 switches the switching circuit 77 so as to connect the latch register 78 and the shift register 74. Upon detecting the rising of the clock signal, the switch control unit 76 switches the switching circuit 77 so as to connect the latch register 78 and the decoders 75a and 75b.

Accordingly, in the case where the first serial data has been transferred from the controller unit 20, the switching of the switching circuit 77 is performed in a mode shown in FIG. 11A. Specifically, the decoders 75a and 75b side is being selected while the first serial data is held in the shift register 74. Then, once the reception of data has finished, the latch signal rises and the shift register 74 side is selected. Thereafter, when the latch signal has risen, the print data held in the shift register 74 is stored in the latch register 78.

On the other hand, in the case where the second serial data has been transferred from the controller unit 20, the switching of the switching circuit 77 is performed in a mode shown in FIG. 11B. Specifically, the clock signal rises at the reception of data and the decoders 75a and 75b side is selected. Then, the second serial data is held in the shift register 74 in this condition. Thereafter, once the reception of data has finished, the latch signal rises and the print data held in the shift register 74 is stored in the latch register 78 via the decoders 75a and 75b. In this way, switching control is performed utilizing differences in the transfer timing of the latch signal and the rising and falling timings thereof with respect to the clock signal.

Such switching control eliminates the need for the reception side (printhead side) to perform switching in advance through reception of a command or the like in order to determine which of non-encoded data (first serial data) and encoded data (second serial data) is to be handled. In other words, it is possible according to the present embodiment to perform switching control using only the data, clock, and latch signal lines without the need to add a special configuration.

The following is a description of the effect obtained by shortening time with reference to the relation between the serial data (the first serial data and the second serial data) and the heat signal shown in FIG. 12.

In the case where the first serial data (24 bits) is transferred to the printhead 3 side using the rising and falling of the clock signal (a clock frequency of approximately 9 MHz), the transfer time of approximately 1.4 μs, including the setup time of the latch signal, is necessary. Here, for example if the heat signal is 0.9 μs, the remaining time of 0.5 μs is useless.

In the case of using the second serial data (16 bits), the transfer time using the same frequency can be shortened to approximately 1.0 μs. This indicates that the transfer time is almost equivalent to the duration of the heat signal. That is, the use of the second serial data enables, for example, printing to be performed while maximizing the capability of the printhead to discharge ink in multi-pass printing modes or the like.

According to the present embodiment as described above, encoded serial data is transferred from the controller unit 20 to the printhead 3 in printing modes in which the number of passes is greater than or equal to a predetermined number, that is, in the case where the number of information pieces indicating print dots included in a single piece of divided block data is less than or equal to a predetermined number. Accordingly, the data transfer time can be shortened.

In addition, such encoded serial data can be transferred without adding a special configuration. This causes neither an increase in the size of the apparatus nor an increase in the number of wires, thus avoiding an increase in cost.

The above is a representative embodiment of the present invention, but the present invention is not limited to the embodiment described above and shown in the drawings. The present invention can also be modified within a scope that does not change the gist of the invention.

For example, although the description of the above embodiment takes the example of the case where the second serial data is used in 8-pass or higher printing modes, the present invention is not intended to be limited thereto. For example, a configuration is possible in which the above-described processing is performed using other numbers of passes as a reference. It is only necessary to determine the number of passes used as a reference from the viewpoint of the maximum number of print dots included in a single piece of divided block data, with which the second serial data having a shorter data length than the first serial data can be generated.

Figure 13:
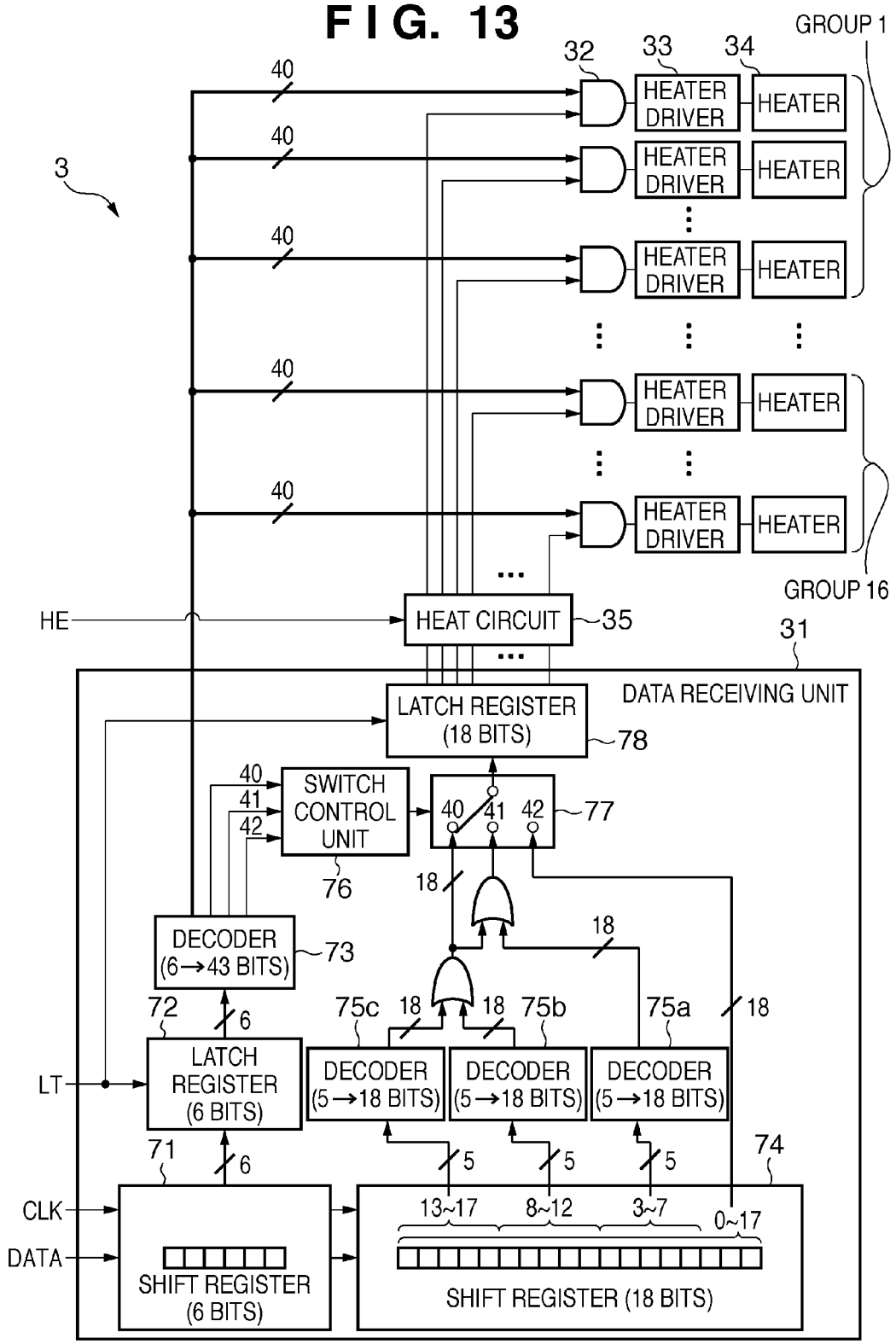
FIG. 13 is a diagram showing an example of a modification.

Now, a possible configuration of the data receiving unit 31 in the case of printing modes (the number of passes) in which the number of print dots included in divided block data is three or less will be described with reference to FIG. 13.

Immediately before sending print data, the controller unit 20 transfers data (an instruction signal) indicating numbers from 40 to 42 to the printhead 3. Upon receiving this data, the printhead 3 causes the decoder 73 for decoding block numbers to input the numbers from 40 to 42, which are other than the effective block numbers from 0 to 39, to the switching circuit. If any of the numbers from 40 to 42 is "1", the switch control unit 76 switches to a switch assigned to the number. If all the numbers from 40 to 42 are "0", the switch control unit 76 does not perform switching and maintains the current connection. For instance, if number 40 is "1", decoders 75c and 75b are selected in order to input encoded data of two dots or less to the latch register 78. If number 41 is "1", a decoder 75a is selected in order to input encoded data of three dots or less to the latch register 78. If number 42 is "1", the shift register 74 is selected in order to input non-encoded data (first serial data) to the latch register 78.

Figure 14:
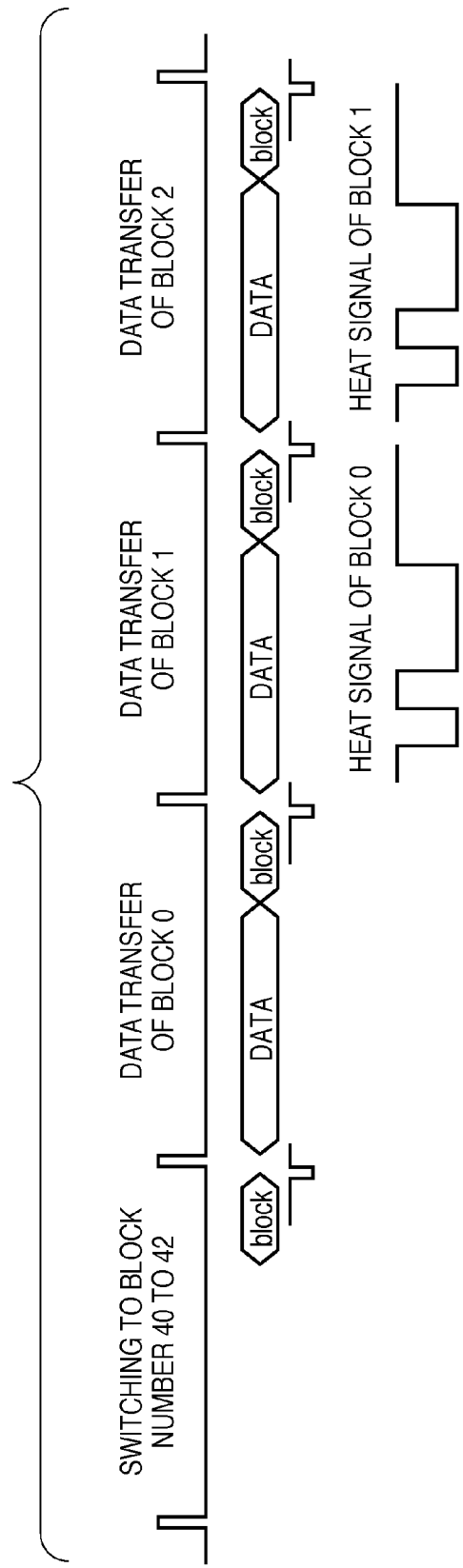
FIG. 14 is a diagram showing an example of driving timings of blocks when printing a single column according to the modification.

With this configuration, switching control of the switching circuit 77 can be performed depending on whether the received data is data of two dots or less, data of three dots or less, or non-encoded data. The switching of the switching circuit can be performed at the timing shown in FIG. 14.

Note that as examples of the printing modes in which the number of print dots included in divided block data is less than or equal to a predetermined number, the above description has given the printing modes in which the predetermined number is two or three dots, but the present invention is not intended to be limited thereto. In the above description, since the number of bits in print data generated at each time of printing is 18 bits, a configuration is adopted in which the second data generation unit is selected in printing modes in which the number of dots included in divided block data is two or three. However, in the case where the length of the print data is longer or shorter than 18 dots, the number of passes in a printing mode, which is used to switch between the first data generation unit 41 and the second data generation unit 42, can be changed appropriately in accordance with the print data length. In other words, the present invention is not limited to the values illustrated above as long as data length can be shortened by the above encoding method as compared with general serial data, and such data can be transferred from the controller unit 20 to the printhead 3.

Furthermore, the above-described embodiment has adopted a configuration in which either the first data generation unit or the second data generation unit is selected depending on the mode, namely, the first and second modes having different numbers of passes. However, the present embodiment is not limited to this configuration. For example, a configuration is possible in which the image processing unit 24 is configured to count the number of data pieces (dots) indicating dots to be printed in each piece of divided block data so that the selection of the first data generation unit or the second data generation unit is made for each piece of divided block data. That is, a configuration is possible in which, as a result of counting the number of dots, if the number of data pieces indicating dots to be printed in divided block data is greater than a predetermined number, the first data generation unit is selected, and if the number of data pieces indicating dots to be printed in divided block data is less than or equal to the predetermined number, the second data generation unit is selected.

Furthermore, although the above embodiment has described the case where the heaters are used to discharge ink as an ink discharge method, the present invention is not intended to be limited thereto. For example, the ink discharge method may be in any form, including a method using piezoelectric elements, a method using electrostatic elements, and a method using MEMS elements.

Furthermore, the above embodiment has described the case where 640 nozzles in nozzle arrays are divided into 40 blocks, each block including 16 nozzles. However, the present embodiment is not intended to be limited thereto, and a configuration is also possible in which nozzles are divided into other numbers of blocks, and the printhead is driven in a time-divisional manner. Furthermore, the present embodiment is also applicable to printing apparatuses that do not adopt time-divisional driving. In this case, a single column of print data is sequentially transferred as a unit to a printhead. In this case, multiple nozzles of the printhead are driven at the same timing. Even with such a configuration, the same action and effect as described in the above embodiment can be obtained if the second data generation unit 42 is selected in multi-pass printing modes in which the number of print dots in a single column of print data is less than or equal to a predetermined number.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-162207 filed on Jul. 16, 2010, which is hereby incorporated by reference herein in its entirety.

What is claimed is:

1. A printing apparatus including a printhead in which printing elements provided in correspondence with a plurality of nozzles are divided into a plurality of blocks and the printing elements are driven block-by block, the apparatus printing an image on a printing medium by driving the printhead based on divided block data for driving printing elements that belong to a same block, the apparatus comprising:
a first converter configured to, in a case where the number of data pieces included in the divided block data and indicating driving of the printing elements is greater than a predetermined number, convert the divided block data into first serial data that indicates whether or not each printing element belonging to the block corresponding to the divided block data is to be driven;
a second converter configured to, in a case where the number of data pieces included in the divided block data and indicating driving of the printing elements is less than or equal to the predetermined number, convert the divided block data into second serial data that indicates at least one of the printing elements to be driven among the printing elements belonging to the block corresponding to the divided block data, the second serial data having a smaller number of bits than the first serial data; and a transfer unit configured to transfer either the first serial data or the second serial data to the printhead, wherein in a case where the second serial data has been received, the printhead converts the second serial data into a data format of the first serial data.

2. The printing apparatus according to claim 1, further comprising:

a counting unit configured to count the number of data pieces included in the divided block data and indicating driving of the printing elements, wherein in a case where the number of data pieces counted by the counting unit and indicating driving of the printing elements is greater than a predetermined number, the first converter converts the divided block data into the first serial data, and in a case where the number of data pieces counted by the counting unit and indicating driving of the printing elements is less than or equal to the predetermined number, the second converter converts the divided block data into the second serial data.

3. The printing apparatus according to claim 1, wherein the case where the number of data pieces included in the divided block data and indicating driving of the printing elements is greater than the predetermined number indicates a case where printing is performed in a first printing mode in which printing of a predetermined region of the printing medium is completed by the printhead scanning over the predetermined region a number of times smaller than a predetermined number of times, and the case where the number of data pieces included in the divided block data and indicating driving of the printing elements is less than or equal to the predetermined number indicates a case where printing is performed in a second printing mode in which printing of the predetermined region is completed by the printhead scanning over the predetermined region a number of times greater than or equal to the predetermined number of times.

4. The printing apparatus according to claim 1, wherein the transfer unit transfers the first serial data or the second serial data to the printhead in synchronization with a clock signal, and transfers a latch signal that indicates completion of transfer of the data to the printhead, and the printhead includes:

a shift register configured to hold either the first serial data or the second serial data transferred from the transfer unit;

a latch register configured to latch the first serial data or the second serial data held in the shift register in accordance with the latch signal;

a decoder configured to convert the second serial data into the data format of the first serial data; and a switching circuit provided between the shift register and the latch register and configured to, in accordance with the clock signal and the latch signal, select either to input the serial data held in the shift register to the latch register via the decoder or to input the serial data held in the shift register directly to the latch register.

5. The printing apparatus according to claim 4, wherein the transfer unit changes a transfer timing and rising and falling timings of the latch signal with respect to the clock signal, so as to switch the selection of the switching circuit.

6. The printing apparatus according to claim 1, wherein the transfer unit transfers an instruction signal to the printhead before transferring the first serial data or the second serial data to the printhead, and the printhead includes:

a shift register configured to hold either the first serial data or the second serial data sent from the transfer unit;

a latch register configured to latch the serial data held in the shift register in accordance with a latch signal;

a decoder configured to convert the second serial data into the data format of the first serial data; and a switching circuit provided between the shift register and the latch register and configured to, in accordance with the instruction signal, select either to input the serial data held in the shift register to the latch register via the decoder or to input the serial data held in the shift register directly to the latch register.

7. The printing apparatus according to claim 3, wherein the second serial data includes a bit region that enables a predetermined number of printing elements to be indicated as printing elements to be driven, and the second printing mode is a mode in which the number of printing elements, among the printing elements that belong to the same block, that are to be driven is less than or equal to the predetermined number.

8. The printing apparatus according to claim 1, wherein the second serial data includes information indicating a group composed of printing elements that correspond to a plurality of consecutive nozzles and that belong to mutually different blocks.

9. A data transfer method performed by a printing apparatus including a printhead in which printing elements provided in correspondence with a plurality of nozzles are divided into a plurality of blocks and the printing elements are driven block-by-block, the apparatus printing an image on a printing medium by driving the printhead based on divided block data for driving printing elements that belong to a same block, the method comprising the steps of:

converting, in a case where the number of data pieces included in the divided block data and indicating driving of the printing elements is greater than a predetermined number, the divided block data into first serial data indicating whether or not each printing element belonging to the block corresponding to the divided block data is to be driven;

converting, in a case where the number of data pieces included in the divided block data and indicating driving of the printing elements is less than or equal to the predetermined number, the divided block data into second serial data that indicates at least one of the printing elements to be driven among the printing elements belonging to the block corresponding to the divided block data, the second serial data having a smaller number of bits than the first serial data; and transferring either the first serial data or the second serial data to the printhead, wherein in a case where the second serial data has been received, the printhead converts the second serial data into a data format of the first serial data.

* * * * *